(12) United States Patent
Smith et al.

(10) Patent No.: US 6,424,345 B1
(45) Date of Patent: Jul. 23, 2002

(54) BINSORTER TRIANGLE INSERTION OPTIMIZATION

(75) Inventors: Wade K. Smith, Sunnyvale; James T. Battle, San Jose, both of CA (US); Chris J. Goodman, Round Rock, TX (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/418,685

(22) Filed: Oct. 14, 1999

(51) Int. Cl.[7] .............................................. G06T 15/00
(52) U.S. Cl. ...................................................... 345/423
(58) Field of Search ................................. 345/419, 423, 345/422, 421, 426, 428

(56) References Cited

U.S. PATENT DOCUMENTS 6,326,964 B1 * 12/2001 Snyder et al. .............. 345/419

* cited by examiner

Primary Examiner—Phu Nguyen
(74) Attorney, Agent, or Firm—Vedder, Price, Kaufman & Kammholz (57) ABSTRACT

A method for rendering polygons in a computer graphics system in which the computer display is divided into a plurality of subregions, and the rasterization process is performed in a micro framebuffer for each subregion, rather than sending raster data for each triangle into the frame buffer. Each polygon undergoes a first stage bounding box intersection test to identify the subregions which are likely to intersect with the polygon. If the number or configuration of intersected subregions exceeds a predetermined threshold requirement, then the polygon undergoes a more precise second stage intersection test to identify which subregions are actually intersected by the polygon. If the number or configuration of intersected subregions is below the threshold requirement, then the control data for the polygon is passed on to each of the identified subregions.

28 Claims, 8 Drawing Sheets

FIG.1

-PRIOR ART-

BINSORTER TRIANGLE INSERTION OPTIMIZATION

FIELD OF THE INVENTION

This invention relates to rendering techniques for computer graphics, and in particular to a technique for optimizing the rendering process for 3-dimensional (3-D) computer graphics.

BACKGROUND OF THE INVENTION

Rendering is the process of converting data representing geometric models into a format for display as individual pixels in an image on a computer screen.

Figure 1:
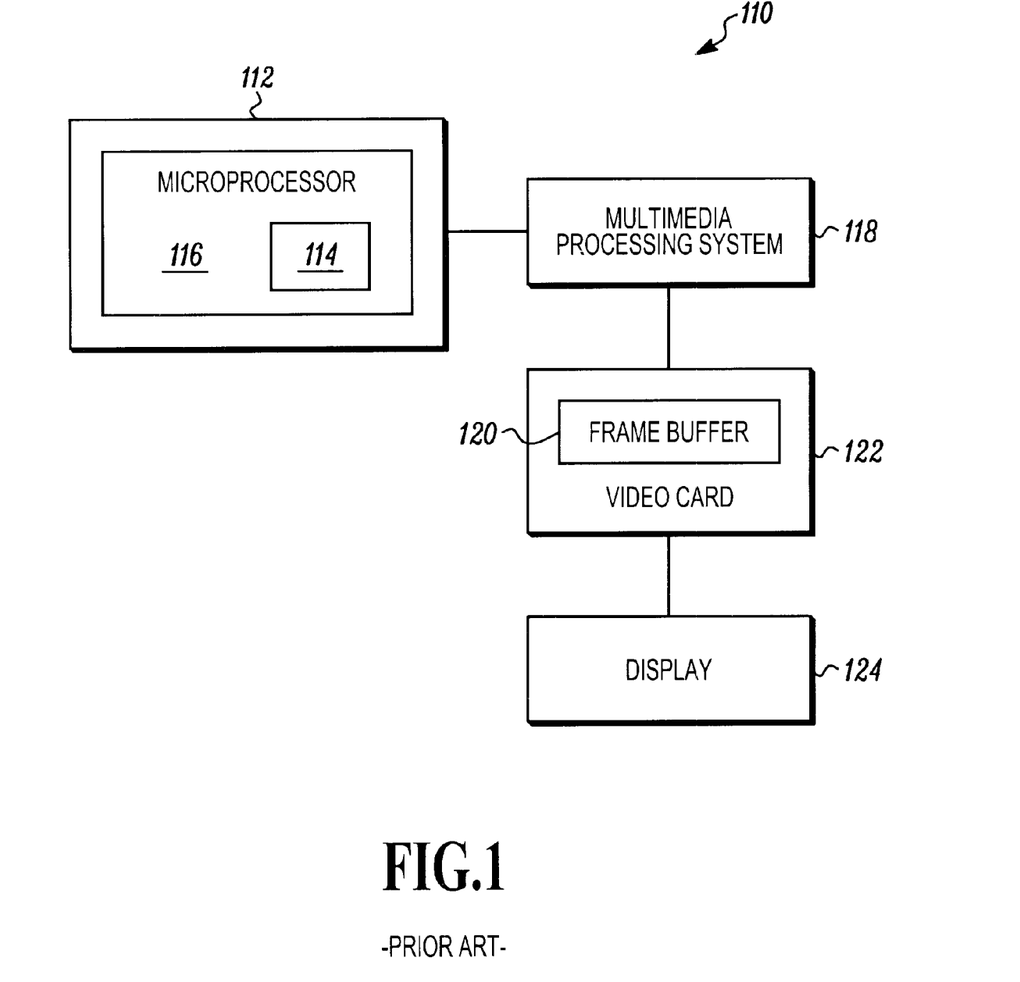
FIG. 1 illustrates a graphics processing and display system.

Referring to FIG. 1, a graphics processing and display system 110 is shown. Graphics system 110 includes an geometry source 112, which generates geometry data in the form of component polygons. In particular, geometry source 112 may comprise an Application Program Interface (API) 114, such as Direct3-D™, executed on a main microprocessor 116.

Geometry source 112 generates a series of geometry data sets, each representing a component polygon such as a triangle. Thus, each geometry data set includes x, y, and z coordinates for each of the three triangle vertices taken from a particular viewpoint, as well as diffuse and specular color information (RGB) associated with each triangle vertex. Each geometry data set may also include for each vertex quantities such as a transparency factor (alpha), texture map coordinates, a fog value, and a perspective correction value (W).

The three-dimensional (3-D) geometry data generated by geometry source 112 is transmitted to a multimedia processing system 118. Multimedia processing system 118 may include a graphics accelerator card or chip separate from main microprocessor 116, or may comprise a set of multimedia logic located on the same processor chip with main microprocessor 116.

Multimedia processing system 118 processes the 3-D geometry data to generate data representing a two-dimensional (2-D) point-of-view image by processing the data through a 3-D pipeline. This pipeline takes the data for each triangle, evaluates the geometry data at each of the three vertices, rasterizes the triangle across a set of pixels on the screen, and writes 2-D image data out to the frame buffer 120.

This 2-D image data is stored in a frame buffer 120 on a video card 122, from which a display image may be created in a conventional manner on a display system 124. Display system 124 may be, for example, a personal computer monitor, a virtual reality goggle screen, or some other visual display.

Certain operations consume more memory bandwidth, such as, for example, alpha blending, which is becoming increasingly utilized for computer game graphics. In the alpha blending process, an alpha value, usually an integer between 0 and 255, is used to determine how to blend a new value produced by the 3-D pipeline with a value already stored in the frame buffer 120, thereby creating the affect of semi-transparency. Therefore, during the alpha blending process, the multimedia processing system must read data produced by the 3-D pipeline of multimedia processing system 118, retrieve data from the frame buffer 120, perform a blending operation on the data, and write out a final, computed result back to the frame buffer 120. These types of operations have increased the demands placed on modern graphics processing and display systems 110.

Accordingly, there is a need for a method of improving the speed and efficiency of 3-D graphics rendering. Specifically, there is a need for an improved method of processing geometry through the 3-D pipeline and reducing the total bandwidth consumed during the overall process of rendering 3-D geometric data.

SUMMARY OF THE INVENTION

In accordance with the present invention, a method for rendering polygons in a computer graphics system is provided in which the computer display is divided into a plurality of subregions, and the rasterization process is performed in a micro framebuffer for each subregion, rather than sending raster data for each triangle directly into the frame buffer. Each polygon undergoes a first stage bounding box intersection test in which a bounding box is formed around the polygon and any subregions which intersect the bounding box are identified as subregions likely to intersect with the polygon. If the number or configuration of intersected subregions exceeds a predetermined threshold requirement, then the polygon undergoes a more precise second stage intersection test to identify which subregions are actually intersected by the polygon. If the number or configuration of intersected subregions is below the threshold requirement, then the control data for the polygon is passed on to each of the subregions identified as likely candidates for intersection.

In one embodiment, the polygons are triangles, and the subregions consist of tiles of 32×32 pixels. When the bounding box intersection test finds that a collection of subregions in a 2×2 array or smaller are likely candidates for intersection, all of the subregions in this array receive control information for the triangle. If the collection of subregions is larger than 2×2, the triangle is considered to be "large" and is sent for a second stage intersection test.

DETAILED DESCRIPTION

Figure 2:
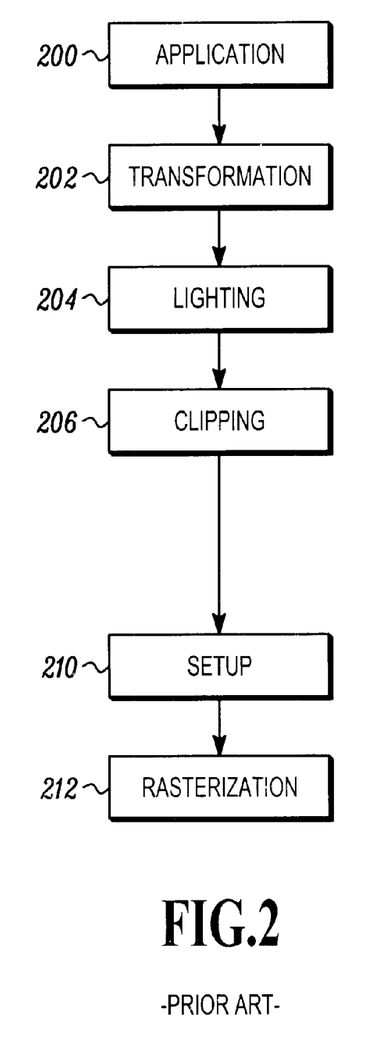
FIG. 2 illustrates a conventional 3-D graphics process.

FIG. 2 shows the 3-D graphics process from an application program to pixels. "Application" 200 is a binary application program that determines the shape, texture, lighting, and viewpoint for objects to be displayed. The data structures and texture maps are passed on to a 3-D library, e.g., OpenGL™ or Direct3-D™, via an Application Programming Interface (API) 114. The 3-D library performs the floating-point intensive processes of transformation, lighting, and clipping. "Transformation" 202 takes a point in an abstract 3-D space ("model space") and rotates, scales, and translates the point into a "world space." Most pieces of a composite geometric object are defined in their own local coordinate space, i.e., model space. At the time of composition and placement of the complete geometric object into a 3-D scene, a transformation is applied to calculate new coordinates in a world space where every object in the scene has a shared coordinate origin and axes orientation.

In the "lighting" 204 step, contributions from various light sources are calculated for that point in 3-D world space. Collections of points defining triangles then undergo "clipping" 206, which attempts to discard any triangles that are off the viewable screen, and to sever portions of triangles that extend beyond the edge of the screen.

Each triangle that makes it past clipping proceeds to a "setup" 210 operation. Setup 210 takes vertex information and determines parameters such as the slopes of the triangle edges and the gradients of various quantities being interpolated over the surface of the triangle. Finally, in "rasterization" 212, the calculated parameters are used to interpolate the vertex data over the entire surface of the triangle to determine individual pixel values, which are then passed into frame buffer 120.

Software-only rasterizers perform all of these operations on the computer's main processor, e.g., an Intel x86 processor. Early 3-D graphics hardware performed the pixel-level rasterization, while later generation 3-D hardware began to perform some of the more floating-point intensive processes such as setup 210.

Figure 3:
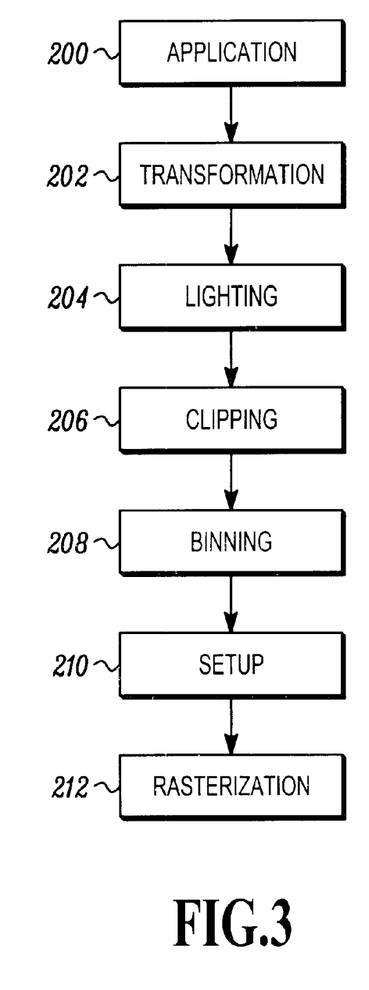
FIG. 3 illustrates a 3-D graphics process in accordance with the present invention.

In accordance with the present invention, an additional "binning" 208 step is added to this 3-D pipeline flow, as shown in FIG. 3. In the binning 208 step, triangle information coming from API 114 is preprocessed and optimized command lists are created. The difference in performance is described below.

Figure 4:
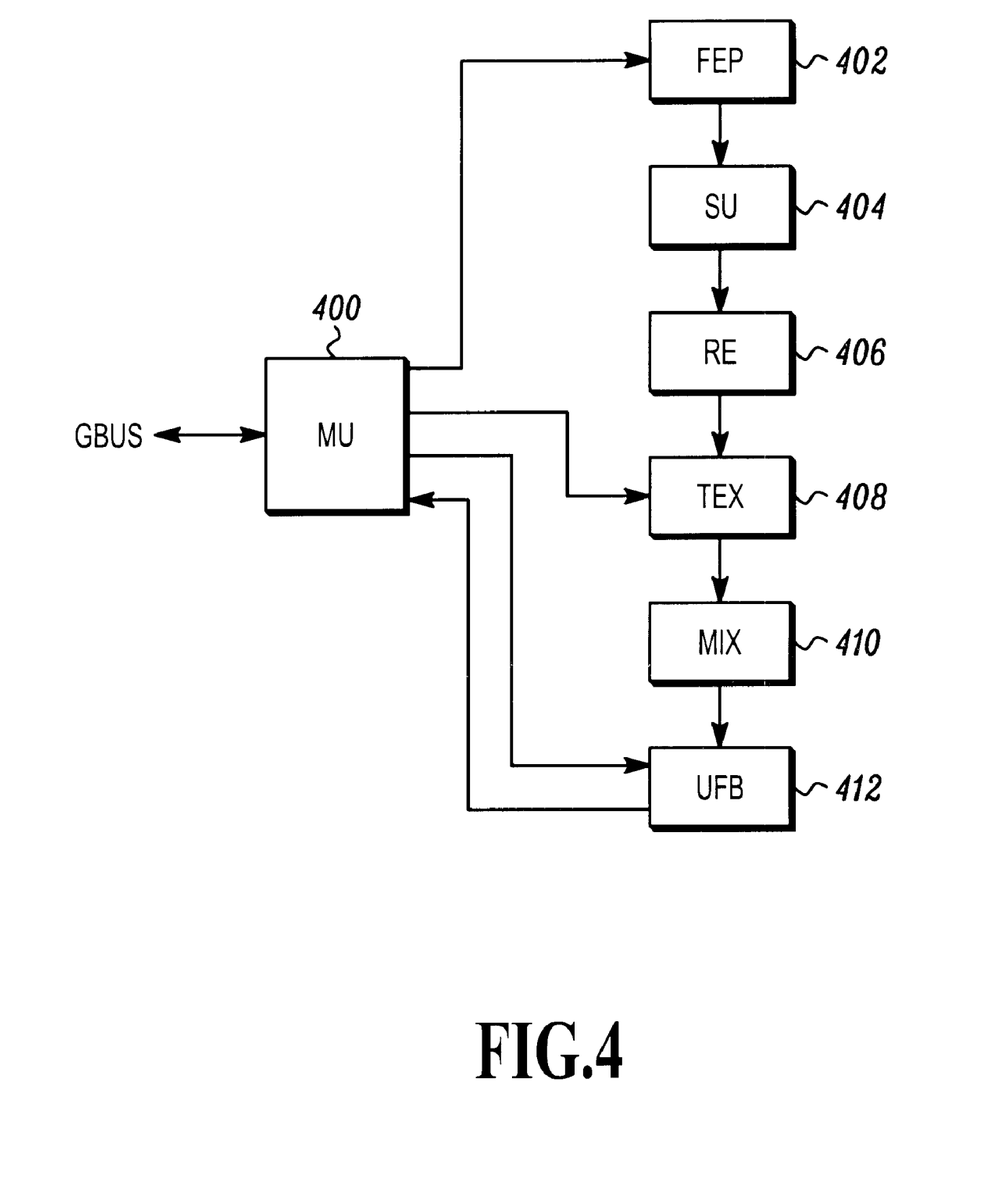
FIG. 4 illustrates a block diagram of a 3-D graphics unit in accordance with the present invention.

FIG. 4 is a high-level block diagram of a 3-D graphics unit in accordance with the present invention. Memory unit (MU) 400 handles all memory transactions with external resources. FIG. 4 illustrates the processes performed in setup 210 and rasterization 212 steps of FIG. 3.

Vertex data may be specified in memory as being in a "flexible" format, wherein not all parameters which are possible are required. Front end processor (FEP) 402 processes the command lists generated in the binning process, fetching all vertex data and state changes specified by the command lists, converting variable vertex formats into a canonical format for setup engine (SU) 404. The canonical format replaces the missing components with default values.

SU 404 takes the three vertices describing a triangle and performs a fixed transformation of the data into a data set suitable for processing by the rasterizer.

Rasterization engine (RE) 406 takes in parameters generated by SU 404 and determines which pixels need to be drawn and the value of the various quantities being interpolated, e.g., diffuse and specular lighting terms, transparency, and texture coordinates, for each pixel. The output of RE 406 is a serial stream of pixel data containing an x-y location along with the value of the interpolants at that location.

Texture unit (TEX) 408 takes the abstract texture coordinates generated by RE 406 and combines that information with the texture filtering mode to generate 1, 2, 4, or 8 texture sampling points along with their filter weights. These texture samples, or texels, are accessed from an on-chip texture cache, up to eight samples per clock cycle. Once all the required texels are in the cache, the eight samples are then interpolated down to a single 32-byte ARGB filtered texel value.

For each triangle, multiple textures may be associated with the surface. With each extra texture source, it takes at least one extra cycle per pixel to process that texture source. The interpolated diffuse and specular RGB lighting contributions are combined with the texture sources in texture/lighting mixing block (MIX) 410. MIX unit 410 contains a configurable arithmetic blending unit that is under the control of the API 114. At the end of this block, the "fogging" step is performed. In fogging, a constant color "fog" is blended with the light and textured pixel, based on the distance from the eyepoint to the vertex. The output data is a stream of pixels, each containing (x, y, z, a, r, g, b) information.

The last stop in the 3-D pipeline is the micro framebuffer unit (UFB) 412, an on-chip storage memory for pixels. UFB 412 accepts the stream of pixels coming from MIX 410 and performs a Z-buffer and stencil test on each to decide whether or not to keep the pixel. Pixels that pass the Z-buffer and stencil tests are also potentially subject to an alpha blending operation.

UFB 412 stores a 32×32 pixel tile of Z,ARGB data using, e.g., two 4 KB SRAMs. The tiles may be double-buffered to allow one tile to be saved to DRAM while the next tile is being generated. UFB 412 also downfilters 2×2 super-samples if antialiasing mode is in effect. Finally, UFB 412 converts between the canonical 32-byte ARGB value used throughout the 3-D pipeline and the actual frame buffer pixel format in DRAM. Because UFB 412 is an on-chip storage memory, it can be accessed very quickly by the rasterization hardware and can also reduce the total bandwidth used to access off-chip memory.

In accordance with the present invention, the rendered image can be stored in a fixed region of video memory, thus enabling the use of conventional display controller hardware to display the image on a computer monitor. The use of conventional display controller hardware allows for a decrease in overall system cost.

Figure 5:
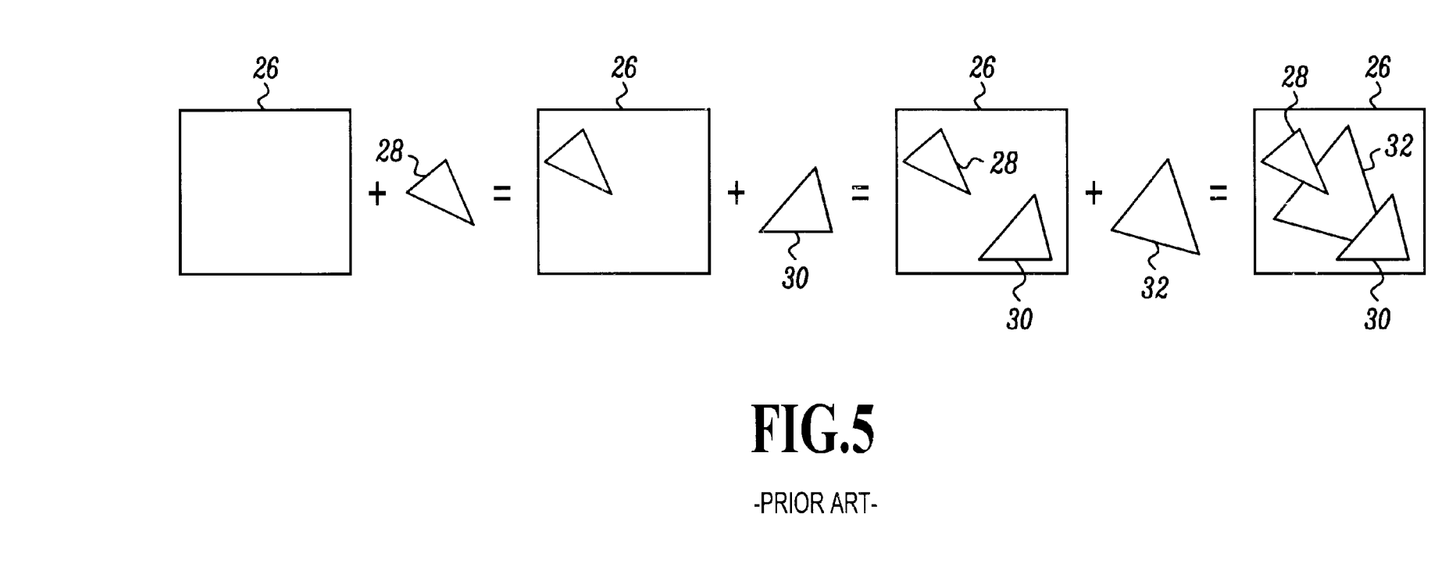
FIG. 5 illustrates a conventional rasterization process.

FIG. 5 shows the conventional way in which individual triangles are rasterized and inserted into the frame buffer. At time 0, frame buffer 26 is empty. A request is made to draw a first triangle 28, and triangle 28 is committed to frame buffer 26. Next, a request is made to draw a second triangle 30, and triangle 30 is deposited in frame buffer 26. When a request is made to draw third triangle 32, which overlaps with triangles 28 and 30, the hardware must determine which pixels to place in front to be displayed. An alpha blending process may also be performed.

In accordance with the present invention, triangles received from API 114 are not immediately drawn to the frame buffer. Instead, the triangles and any interleaved state changes are stored in memory in special data structures. These data structures may exist in DRAM accessible to the setup/rasterization hardware. The data structures may be in dedicated graphics memory or may be shared with the system processor in, for example, a unified memory architecture (UMA). The amount of memory may be dynamically managed.

The display region, e.g., computer screen, is subdivided into a plurality of tiles, which are rectangular subregions of the display, and all rendering is done on one image tile at a time. Depending on the sampling mode, the tiles can be either 32×32 pixels or 16×16 pixels. Only after all the triangles and state changes for one frame are recorded in memory is the actual drawing operation ready to begin.

Figure 6:
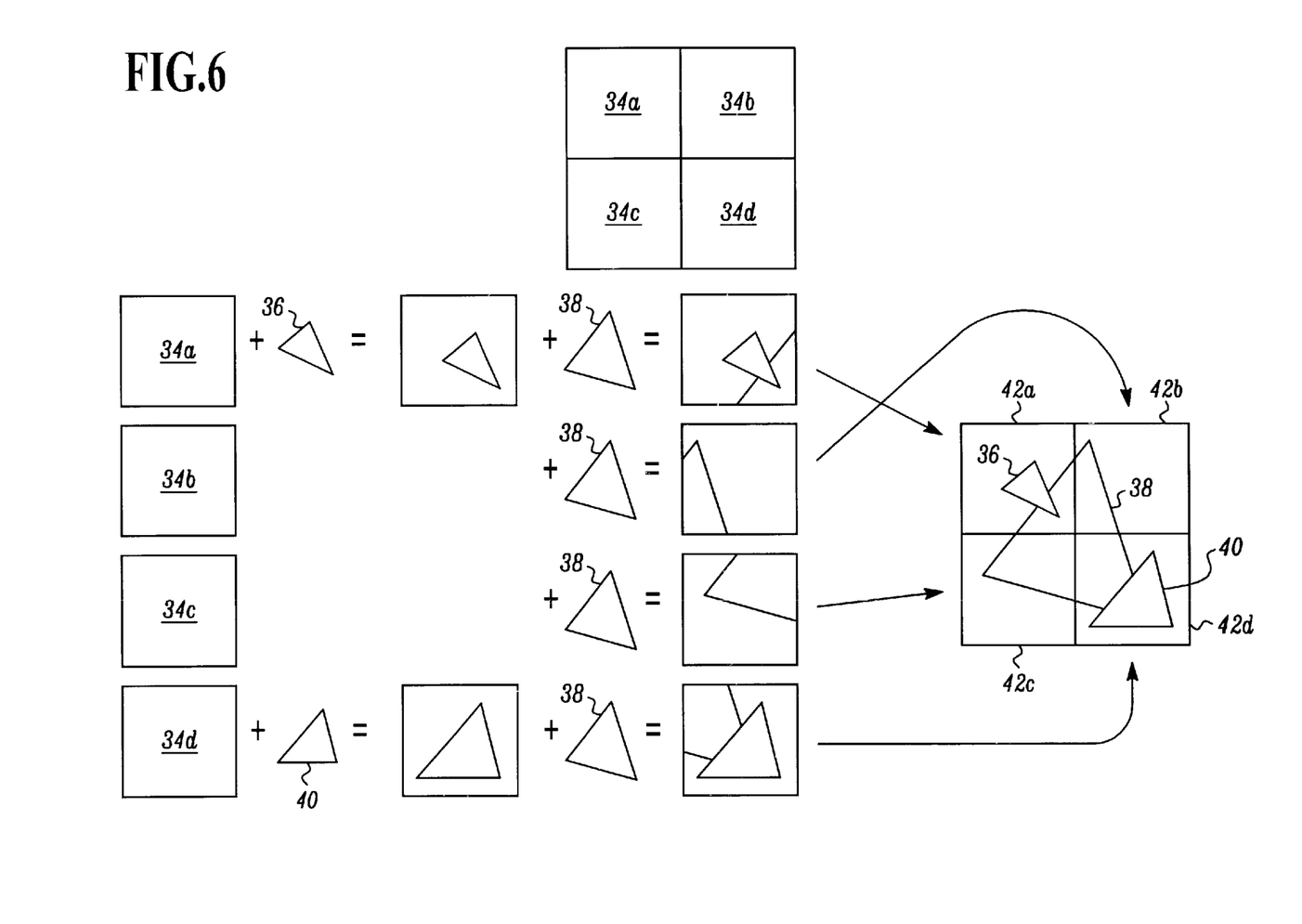
FIG. 6 illustrates a rasterization process in accordance with the present invention.

FIG. 6 illustrates the rendering process according to the present invention of the same sequence of triangles from FIG. 5. The display region shown here is divided into only four tiles 34a–d for simplicity. Rather than completing one triangle before starting the next, rendering is accomplished one tile at a time. If the triangle is large, relative to the size of the tiles, and overlaps with more than one region, this will result in a triangle being processed multiple times. In FIG. 6, first triangle 36 is drawn into tile 34a in UFB 412, and second triangle 38, a portion of which overlaps tile 34a, is drawn into the region, using traditional Z buffer algorithms to determine how the overlapping triangles 36 and 38 are displayed relative to each other. Once tile 34a is complete, the RGB sub-image can be saved into the corresponding location 42a of the frame buffer. Tile 34b is only intersected by triangle 38, and that portion of triangle 38 is drawn into tile 34b, and the image is saved into the corresponding location 42b of the frame buffer. Similarly, a portion of triangle 38 is then drawn into tile 34c, which is then saved into location 42c. Finally, tile 34d receives data from both triangle 40 and triangle 38, and the data is passed to the frame buffer.

This operation will now be described with respect to the diagram in FIG. 4. UFB 412 accepts the (x, y, a, r, g, b) pixel fragments from MIX 410 and performs the frame buffer operations specified by API 114. The operations include the alpha test, stencil and Z buffer tests, and ultimately an alpha blending operation on the ARGB value. UFB 412 also loads and stores the tiles to the computer's main memory or video memory residing on a graphics card. This requires converting the pixel format and converting the logical (x, y) pixel addresses into the linear frame buffer addresses of DRAM. If antialiasing is being performed, a 2×2 downsampling of the pixels must be performed prior to storing the data to DRAM.

In one embodiment, UFB 412 includes its own memory, e.g., four SRAMs, each one big enough to hold a 32×32× 32-byte (4 KB) tile. This memory would reside on chip in multimedia processing system 118. Two of the SRAMs are set aside to hold Z/stencil (Z/S) values, and the remaining two hold the corresponding ARGB pixel values. The micro framebuffer is double buffered, with operations alternating between each pair of buffers.

When an antialiasing mode is selected, UFB 412 performs four 32-byte pixel operations per clock cycle. These four 32-byte pixels represent a 2×2 group of supersamples, each supersample being in a 16×16 tile. When antialiasing is not used, each tile is 32×32 pixels. Thus, on a 640×480 image display, there are 20 tiles across and 15 tiles down, making a total of 300 tiles to be processed for each frame.

The most resource-heavy process is managing the data corresponding to these triangles and determining which tiles are intersected by the triangle. There is an overhead associated with the process of identifying the intersected tiles that can be easily amortized against rasterization when dealing with large triangles, i.e., triangles large enough to intersect with a large number of subregions, but tends to occupy much more of the average processing time for small triangles, which may intersect only one or two subregions.

In accordance with the present invention, a method is provided for improving the efficiency of this determination. The method includes a first stage bounding box intersection test between the triangle and screen subregions, and a second stage exact subregion intersection test, similar to a 3-D rasterization step, in which the triangle edges are processed to precisely compute subregion crossings. Control information is then inserted into each horizontal row of subregions that fall between the leftmost and rightmost edges of the triangle based on the results of this second stage test. Under certain conditions, the more precise second stage, which expends far more system resources, can be skipped. By properly choosing the optimal point at which to skip the second step, the overall use of computing resources can be optimized by balancing the workloads associated with binning and the loads associated with setup.

Figure 7:
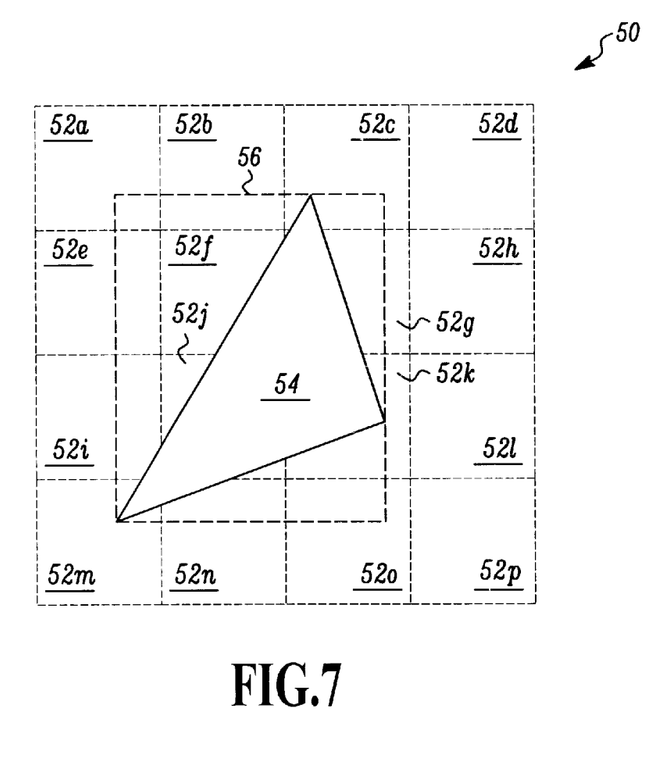
FIG. 7 illustrates a bounding box intersection test in accordance with the present invention.

FIG. 7 illustrates the first stage bounding box intersection test that takes place in a software or hardware module called a binsorter. This bounding box intersection test occurs before triangle setup and rasterization. Here, triangle 54 is shown in a portion of the display 50 including sixteen tiles 52a–52p, arranged in 4×4 fashion. A bounding box 56 is constructed around triangle 54 by computing the minimum and maximum x and y values of triangle 54. Based on the size and location of the bounding box 56, the binsorter can identify the tiles with which it is likely that triangle 54 will intersect.

In FIG. 7, bounding box 56 intersects tiles 52a, 52b, 52c, 52e, 52f, 52g, 52i, 52j, 52k, 52m, 52n, and 52o, and the bounding box intersection test identifies these tiles as being candidates for intersection with triangle 54. From the results of this bounding box test, it is clear that triangle 54 will not intersect tiles 52d, 52h, 52l, and 52p and, accordingly, control information for triangle 54 will not be processed in those regions. Note that when the team "intersect" is used, this refers to tiles that intersect the edges of the bounding box or triangle, as well as those tiles that are wholly encompassed within the bounding box or triangle.

While the bounding box intersection test can be quickly and easily accomplished by the binsorter, it can be seen from FIG. 7 that the test is not perfectly precise in its initial determination. Although twelve of the tiles 52a–52p were identified by the bounding box test as being potential hits for triangle 54, in fact, triangle 54 only exists in seven of the tiles, tiles 52c, 52f, 52g, 52j, 52k, 52m, and 52n. Because of this imprecision, it is advantageous for large triangles such as triangle 54 to be sent for second stage processing to more precisely identify which tiles it intersects.

Figure 8A:
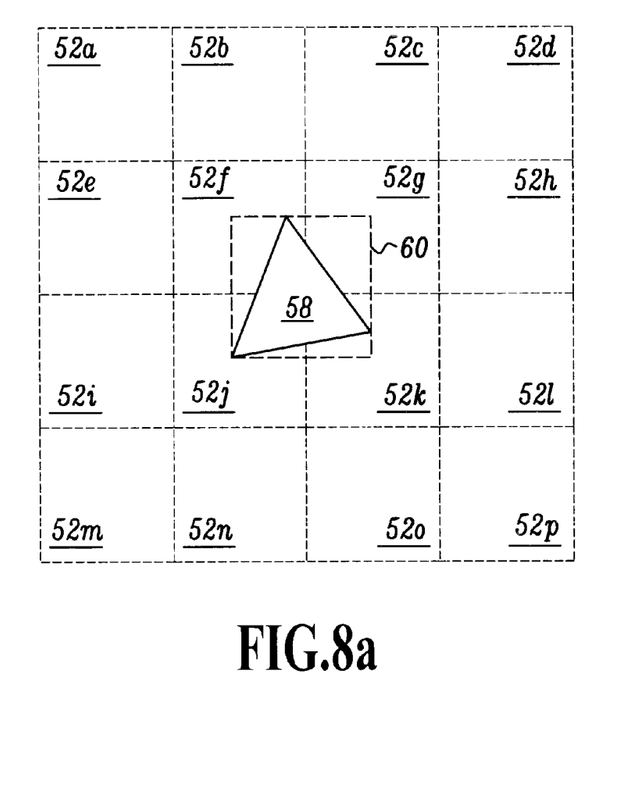
FIGS. 8a–8d illustrate multiple examples of the bounding box intersection test in accordance with the present invention.

In other cases, however, the inaccuracy introduced by the imprecision of the bounding box intersection test is not as significant. FIG. 8a shows small triangle 58, outlined by bounding box 60. The bounding box intersection test identifies four tiles 52f, 52g, 52j, and 52k, as candidates for intersection with triangle 58. In this case, the bounding box intersection test precisely identified the four tiles which are, in fact, intersected by triangle 58.

Figure 8B:
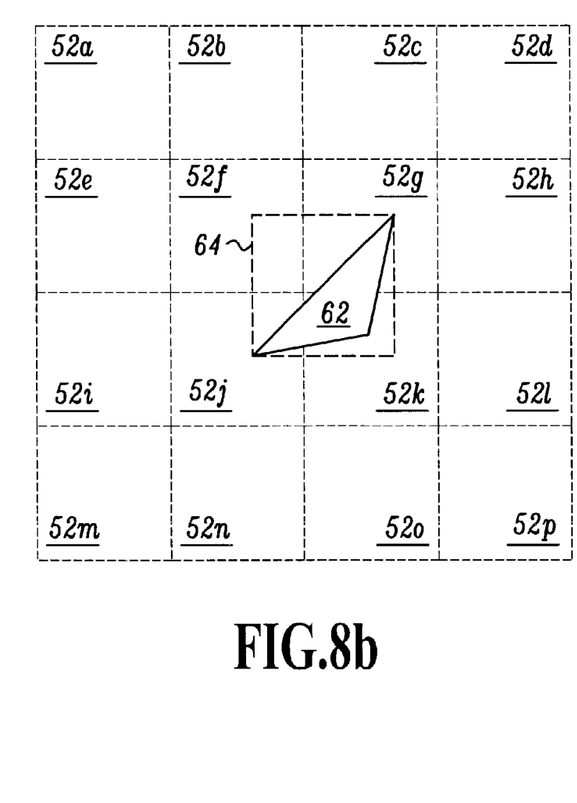

FIG. 8b shows a different scenario. Here, bounding box 64 is created around small triangle 62, and the intersection test identifies the same four tiles 52f, 52g, 52j, and 52k as candidates for intersection. Because of the shape and placement of triangle 62, it actually only intersects tiles 52g, 52j, and 52k. In this case, the bounding box intersection test identified only one tile 52f not intersected by triangle 62 as being a candidate for intersection.

Figure 8C:
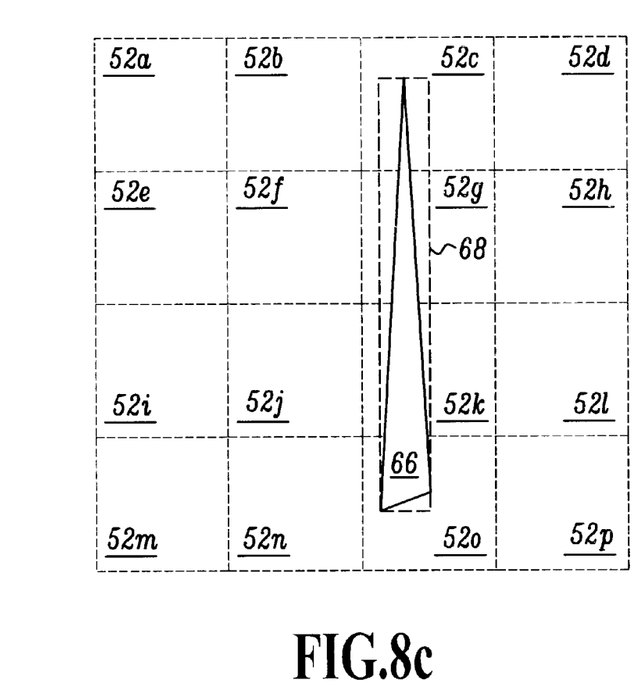

FIG. 8c shows triangle 66 encompassed by bounding box 68. Here, bounding box 68 intersects tiles 52c, 52g, 52k, and 52o, and all four identified candidates are, in fact, intersected by triangle 68.

Figure 8D:
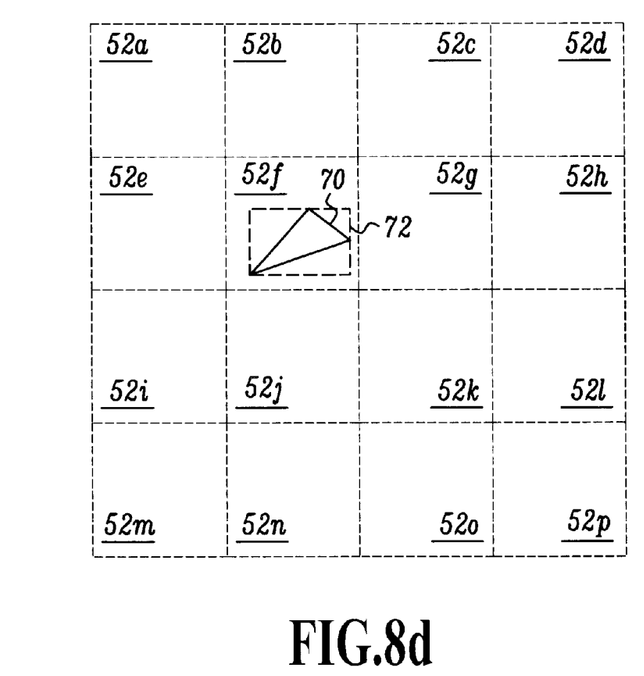

Finally, FIG. 8d shows the situation where triangle 70 exists wholly in one tile 52f. In this case, the bounding box test properly identifies tile 52f as the only candidate for intersection.

In each of the cases illustrated in FIGS. 8a–8d, the results of the bounding box intersection test fairly accurately identified which of the tiles 52a–52p were intersected by the triangles 58, 62, 66, and 72. In the case of the large triangle 54, the cost of performing the second stage analysis is outweighed by the resource savings from eliminating the extraneous tiles identified in the bounding box intersection test. However, for smaller triangles 58, 62, 66, and 72, the first stage bounding box intersection test is sufficiently accurate to justify skipping the second stage.

For FIG. 8b, control information for triangle 62 will be inserted directly into data structures associated with tiles 52f, 52g, 52j, and 52k so that the graphical representation of triangle 62 can be rasterized in those locations. Although triangle 62 does not actually intersect tile 52f, this will not pose a problem. During the rendering stage of tile 52f, control information for triangle 62 will be processed and, at that point, rasterization data corresponding to triangle 62 which is not located in tile 52f will be discarded. Although this results in wasted processing by the 3-D rasterizer, it will not result in errors in the display.

The memory required to complete the binsorting procedure may, in some cases, exceed the amount of available memory. In such a situation, the binsorter may stop at an appropriate point prior to exceeding its memory limits and send all data collected up to that point to rasterization.

In one embodiment of the present invention, when the bounding box intersection test identifies a region of 2×2 tiles or smaller as being candidates for intersection, the triangles are determined to be sufficiently small and are inserted into the subregion data structures without the second stage processing.

In another embodiment, the second stage processing is skipped if the total number of tiles identified is less than four, regardless of where those tiles are located relative to each other.

In a third embodiment, the second stage processing may be skipped only if the ratio of number of tiles identified to the total number of tiles displayed is below a certain level. This ratio may be set at, for example, 0.014. In this case, if the total number of tiles displayed is 300 and a certain triangle, when processed through the bounding box intersection test, results in four candidate tiles, then the ratio of tiles identified to total number of tiles is 4/300, or 0.0133, and the triangle will not proceed to the second stage processing. If the bounding box test identifies 5 tiles as candidates for intersection, then the ratio would be 0.0167, and the tile would proceed to the second stage processing for more precise analysis.

In a fourth embodiment, the second stage processing may be skipped if the triangles are sufficiently narrow and lie along either the x or y axis of the display. In this case, the identified tiles would be arranged as shown in FIG. 8c such that they are only one tile wide or one tile high. In other words, the second stage test is unnecessary if the configuration of tiles lies in a 1×A formation, where A is any whole number.

In accordance with the present invention, any arrangement of tiles may be chosen as the threshold determination as to whether or not the triangle is passed on to the second stage processing. The binsorter may select all triangles whose bounding boxes intersect at most 3×2 or 3×3 tiles as being appropriate for skipping the second stage. Alternatively, the threshold determination may include a plurality of configurations, and if the identified subregions are larger than all of the predetermined configurations, then the second stage test will be applied.

The algorithm for making this determination is affected by a number of factors, such as hardware speed, available bandwidth, type of graphics being displayed, amount of available memory, or whether antialiasing is enabled, and may be identified through statistical observation of 3-D graphics performance.

Figure 9:
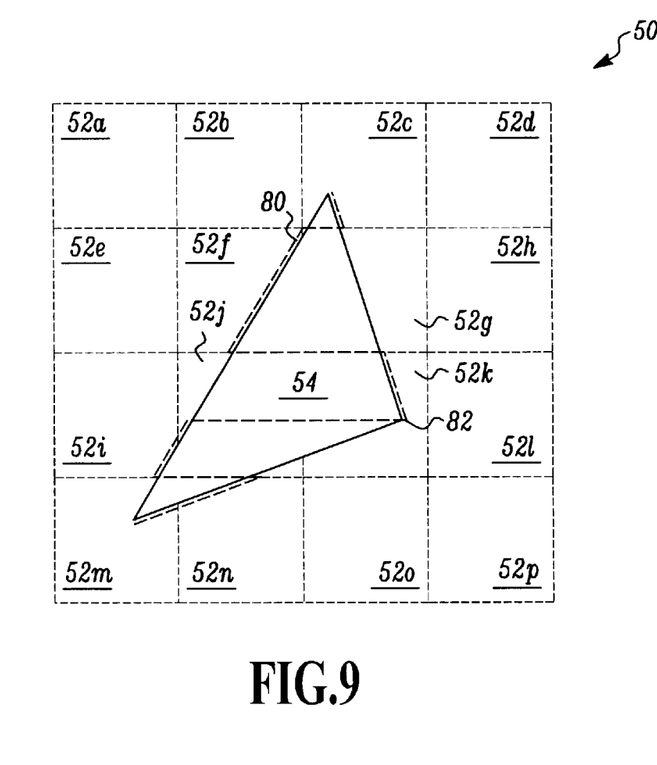
FIG. 9 illustrates the second stage intersection test in accordance with the present invention.

The second stage processing is illustrated in FIG. 9. Here, the edges of triangle 54 are processed to precisely compute subregion crossings, rather than by using the less precise bounding box intersection test. This may be accomplished by scanning left and right along the x-axis, and following the edges of triangle 54 to determine which tiles 52a–52p are intersected along each horizontal row of tiles.

A variety of algorithms may be utilized for performing this second stage scanning. In the embodiment illustrated in FIG. 9, the scanning of triangle 54 begins at the topmost corner and proceeds downwards along the right edge of triangle 54 until it reaches the vertical boundary between tiles 52c and 52g. Then, the scanning proceeds along the x-axis until it reaches the left edge of triangle 54, at which point scanning proceeds downward along the left edge until it reaches the next vertical boundary between tiles 52f and 52j. Here, scanning moves along the x-axis and then downward along the right edge of triangle 54. It is important that the location of inflection point 82 be determined as part of this scanning process. Scanning continues as illustrated in FIG. 9.

If an edge of triangle 54 were to intersect a corner between four tiles, the underlying rasterization fill rules are used to determine whether that point is included or excluded. In a typical case, top-left intersection rules are used; if a corner is in the top and/or left edge of a triangle, it is included.

In FIG. 9, this second stage test identifies tiles 52c, 52f, 52g, 52j, 52k, 52m, and 52n as being intersected by triangle 54. Unlike the bounding box intersection test, all of the identified tiles are actually intersected.

For FIG. 9, control information for triangle 54 will be inserted directly into data structures associated with each of the identified tiles 52c, 52f, 52g, 52j, 52k, 52m, and 52n, so that the graphical representation of triangle 54 can be rasterized in those locations. Had the subregions identified during the bounding box intersection test for triangle 54, shown in FIG. 7, been passed directly to the rasterization stage without the second stage processing, five additional tiles 52a, 52b, 52e, 52i, and 52o would have unnecessarily received control information for triangle 54. Unlike the situation shown in FIGS. 8a–8d, this amount of extraneous processing would have had a significant impact on the overall performance of the graphics system. Therefore, the additional burden on resources created by the second stage processing resulted in an overall savings.

Although the invention has been described with reference to particular embodiments, the description is only an example of the invention's application and should not be taken as a limitation. Various other adaptations and combinations of features of the embodiments disclosed are within the scope of the invention as defined by the following claims.

What is claimed is:

1. A method of rendering a polygon, comprising:

dividing a display area into subregions;

generating a frame around the polygon;

identifying subregions intersected by the frame;

when the subregions intersected by the frame are larger than a predetermined configuration, identifying each of the subregions intersected by the polygon within the generated frame and inserting control information for said polygon into data structures associated with each of the subregions intersected by the polygon; and when the subregions intersected by the frame are not larger than a predetermined configuration, inserting control information for said polygon into data structures associated with each of the subregions intersected by the frame; and processing the control information in each data structure to render an image of the polygon.

2. The method of claim 1, wherein said predetermined configuration is a configuration selected from the group consisting of a 2×2 configuration of subregions, a 3×2 configuration of subregions, and one subregion.

3. The method of claim 1, wherein said predetermined configuration is a 1×A configuration of subregions, where A is any whole number.

4. The method of claim 1, wherein said predetermined configuration is a A×1 configuration of subregions, where A is any whole number.

5. The method of claim 1, wherein said predetermined configuration is any arrangement of A subregions, where A is any whole number.

6. The method of claim 5, wherein A is four.

7. The method of claim 1, wherein said polygon is a triangle.

8. The method of claim 1, wherein said dividing step comprises dividing the display area into subregions of 32×32 pixels.

9. The method of claim 1, wherein said dividing step comprises dividing the display area into subregions of 16×16 pixels.

10. The method of claim 1, wherein said frame is rectangular.

11. The method of claim 10, wherein said generating step comprises locating a minimum and a maximum x-coordinate value for the polygon and identifying a minimum and a maximum y-coordinate value for the polygon, thereby generating the rectangular frame around the polygon.

12. A method of rendering 3-D graphical images on a memory of a computer, comprising:

performing a graphical operation to divide an image into a plurality of polygons;

dividing a display area into subregions;

for each polygon:

generating a frame around the polygon;

identifying subregions intersected by the frame;

when the subregions intersected by the frame are larger than a predetermined configuration, identifying each of the subregions intersected by the polygon within the frame and inserting control information for said polygon into data structures associated with each of the subregions intersected by the polygon; and when the subregions intersected by the frame are not larger than a predetermined configuration, inserting control information for said polygon into data structures associated with each of the subregions intersected by the frame; and processing the control information in each data structure to render an image of the plurality of polygons into the memory of the computer.

13. The method of claim 12, wherein said predetermined configuration is a configuration selected from the group consisting of a 2×2 configuration of subregions, a 3×2 configuration of subregions, and one subregion.

14. The method of claim 12, wherein said predetermined configuration is a 1×A configuration of subregions, where A is any whole number.

15. The method of claim 12, wherein said predetermined configuration is a A×1 configuration of subregions, where A is any whole number.

16. The method of claim 12, wherein said predetermined configuration is any arrangement of A subregions, where A is any whole number.

17. The method of claim 16, wherein A is four.

18. The method of claim 12, wherein said plurality of polygons is a plurality of triangles.

19. The method of claim 12, wherein said dividing step comprises dividing the display area into subregions of 32×32 pixels.

20. The method of claim 12, wherein said dividing step comprises dividing the display area into subregions of 16×16 pixels.

21. The method of claim 12, wherein said frame is rectangular.

22. The method of claim 21, wherein said generating step comprises locating a minimum and a maximum x-coordinate value for each polygon and identifying a minimum and a maximum y-coordinate value for each polygon, thereby generating the rectangular frame around each polygon.

23. A polygon rendering method, comprising:

dividing a display area into subregions;

performing a first stage intersection determination, wherein a bounding box is provided about a polygon to be rendered;

when the subregions intersected by the bounding box in the first stage exceed a threshold configuration, performing a second stage intersection determination, wherein the actual subregions intersected by the polygon are identified by determining the crossing points between the polygon and each of the subregions within the provided bounding box and inserting control information for the polygon into data structures corresponding to each of the subregions identified in the second stage;

when the subregions intersected by the bounding box in the first stage do not exceed the threshold configuration, inserting control information for the polygon into data structures corresponding to each of the subregions intersected by the bounding box; and processing the control information in each data structure to render an image of the polygon.

24. The method of claim 23, wherein the threshold configuration is selected from the group consisting of a 2×2 configuration of subregions, a 3×2 configuration of subregions and a single subregion.

25. The method of claim 23, wherein the threshold configuration is a 1×A configuration of subregions, where A is any whole number.

26. The method of claim 23, wherein the threshold configuration is an A×1 configuration of subregions, where A is any whole number.

27. The method of claim 23, wherein the polygon is a triangle.

28. The method of claim 23, wherein the bounding box is generated by locating a minimum and a maximum x-coordinate value for the polygon and identifying a minimum and a maximum y-coordinate for the polygon and framing a border about minimum and maximum x-coordinate and y-coordinate.

* * * * *